(12) United States Patent
Cakir et al.

(10) Patent No.: US 9,110,630 B2
(45) Date of Patent: Aug. 18, 2015

(54) PORTABLE ELECTRONIC DEVICE CASE WITH AN ADHESIVE PANEL

(71) Applicant: Targus Group International, Inc., Anaheim, CA (US)

(72) Inventors: Omer Faruk Cakir, Tustin, CA (US); Bakir Silajdzic, Irvine, CA (US); Remzi Oten, Anaheim, CA (US); Fevzi Oten, Irvine, CA (US)

(73) Assignee: Targus Group International, Inc., Anaheim, CA (US)

( * ) Notice: Subject to any disclaimer, the term of this patent is extended or adjusted under 35 U.S.C. 154(b) by 0 days.

(21) Appl. No.: 14/341,149

(22) Filed: Jul. 25, 2014

(65) Prior Publication Data

US 2015/0027911 A1    Jan. 29, 2015

Related U.S. Application Data

(60) Provisional application No. 61/858,410, filed on Jul. 25, 2013.

(51) Int. Cl.
*A45C 11/00* (2006.01)
*G06F 1/16* (2006.01)
*H04B 1/3888* (2015.01)

(52) U.S. Cl.
CPC .............. *G06F 1/1633* (2013.01); *A45C 11/00* (2013.01); *H04B 1/3888* (2013.01); *A45C 2011/002* (2013.01); *A45C 2011/003* (2013.01); *A45C 2200/15* (2013.01)

(58) Field of Classification Search
CPC .. B65D 85/00; B65D 5/5206; A47B 21/0314; A45C 2011/001; A45C 2011/002; A45C 2011/003; G06F 1/1633; G06F 1/1626; H04B 1/3888

USPC .......................... 206/45.23, 320, 45.2, 45.24; 361/679.55, 679.56; 455/575.8
See application file for complete search history.

(56) References Cited

U.S. PATENT DOCUMENTS

| | | | |
|---|---|---|---|
| 1,121,422 A | 12/1914 | Tydings | |
| 2,554,215 A | 5/1951 | Schell et al. | |
| 2,556,066 A | 6/1951 | Cline | |
| 3,292,778 A | 12/1966 | Enderle | |

(Continued)

FOREIGN PATENT DOCUMENTS

| | | |
|---|---|---|
| CA | 2 785 813 A1 | 12/2011 |
| CA | 2 758 982 A1 | 5/2012 |

(Continued)

OTHER PUBLICATIONS

Non-Final Office Action for U.S. Appl. No. 13/155,266 filed Jun. 7, 2011, and mailed from the USPTO on Nov. 6, 2014, 35 pgs.

(Continued)

*Primary Examiner* — Steven A. Reynolds
(74) *Attorney, Agent, or Firm* — John R. Thompson; Stoel Rives LLP

(57) ABSTRACT

Case accessories for portable electronic devices are disclosed. In some embodiments, a case accessory may include a base configured to sit on a working surface, a support coupled to the base and configured to support a portable electronic device in an elevated position, and an adhesive panel coupled to the support and configured to secure the portable electronic device.

14 Claims, 10 Drawing Sheets

(56) References Cited

U.S. PATENT DOCUMENTS

| | | | |
|---|---|---|---|
| 3,441,072 A | 4/1969 | Schmitt | |
| 3,530,213 A | 9/1970 | Isle | |
| 3,620,149 A | 11/1971 | Ogihara | |
| D230,376 S | 2/1974 | Andrew | |
| 4,106,597 A | 8/1978 | Shook et al. | |
| 4,259,568 A | 3/1981 | Dynesen | |
| 4,700,832 A | 10/1987 | Champ | |
| 4,901,897 A | 2/1990 | Briggs et al. | |
| 5,024,328 A | 6/1991 | Bontrager | |
| 5,165,649 A | 11/1992 | Neumann et al. | |
| 5,207,327 A | 5/1993 | Brondos | |
| 5,217,119 A | 6/1993 | Hollingsworth | |
| 5,330,049 A | 7/1994 | Bertelsen et al. | |
| 5,356,004 A | 10/1994 | Weinreb | |
| 5,375,076 A | 12/1994 | Goodrich et al. | |
| D356,120 S | 3/1995 | Allen | |
| D357,918 S | 5/1995 | Doria | |
| 5,480,118 A | 1/1996 | Cross | |
| 5,524,754 A | 6/1996 | Hollingsworth | |
| 5,544,792 A | 8/1996 | Arnwine | |
| 5,555,157 A | 9/1996 | Moller et al. | |
| 5,594,619 A | 1/1997 | Miyagawa et al. | |
| 5,607,054 A | 3/1997 | Hollingsworth | |
| 5,622,262 A | 4/1997 | Sadow | |
| 5,769,221 A | 6/1998 | Cyr | |
| 5,775,496 A | 7/1998 | Cyr | |
| 5,797,044 A | 8/1998 | Lawther et al. | |
| 5,887,723 A * | 3/1999 | Myles et al. | 206/760 |
| 5,971,148 A | 10/1999 | Jackson | |
| 5,996,778 A * | 12/1999 | Shih | 206/45.2 |
| 6,082,543 A | 7/2000 | Béliveau | |
| 6,131,734 A | 10/2000 | Hollingsworth et al. | |
| 6,173,933 B1 | 1/2001 | Whiteside et al. | |
| 6,237,766 B1 | 5/2001 | Hollingsworth | |
| 6,334,533 B1 | 1/2002 | Hollingsworth et al. | |
| 6,334,534 B1 | 1/2002 | Hollingsworth et al. | |
| D453,749 S | 2/2002 | Lee et al. | |
| 6,494,321 B1 * | 12/2002 | Sadow et al. | 206/320 |
| 6,535,199 B1 | 3/2003 | Canova, Jr. et al. | |
| D476,149 S | 6/2003 | Andre et al. | |
| 6,746,638 B1 | 6/2004 | Zadesky et al. | |
| 6,772,879 B1 * | 8/2004 | Domotor | 206/45.23 |
| 6,785,566 B1 | 8/2004 | Irizarry | |
| D500,923 S | 1/2005 | Gonzalez et al. | |
| 6,856,506 B2 | 2/2005 | Doherty et al. | |
| D513,008 S | 12/2005 | Takizawa et al. | |
| D527,176 S | 8/2006 | Andre et al. | |
| D529,717 S | 10/2006 | Brancky | |
| D533,348 S | 12/2006 | Andre et al. | |
| 7,207,154 B2 | 4/2007 | Araujo | |
| D541,646 S | 5/2007 | Hayes et al. | |
| 7,281,698 B2 | 10/2007 | Patterson, Jr. | |
| D574,375 S | 8/2008 | Prest et al. | |
| D574,819 S | 8/2008 | Andre et al. | |
| 7,414,833 B2 | 8/2008 | Kittayapong | |
| 7,451,872 B1 | 11/2008 | Allen | |
| D582,405 S | 12/2008 | Andre et al. | |
| 7,467,695 B2 | 12/2008 | Gormick et al. | |
| 7,495,895 B2 | 2/2009 | Carnevali | |
| 7,500,561 B2 | 3/2009 | Matias et al. | |
| 7,503,440 B2 | 3/2009 | Gormick et al. | |
| D593,528 S | 6/2009 | Shi | |
| D600,699 S | 9/2009 | Johnston et al. | |
| 7,652,873 B2 | 1/2010 | Lee | |
| D610,111 S | 2/2010 | Kim et al. | |
| 7,735,644 B2 | 6/2010 | Sirichai et al. | |
| 7,747,007 B2 | 6/2010 | Hyun et al. | |
| D619,554 S | 7/2010 | Kim et al. | |
| D623,404 S | 9/2010 | Andre et al. | |
| D623,638 S | 9/2010 | Richardson et al. | |
| D623,639 S | 9/2010 | Richardson et al. | |
| D628,197 S | 11/2010 | Li | |
| 7,835,145 B2 | 11/2010 | Chiang et al. | |
| D629,772 S | 12/2010 | Mo et al. | |
| 7,876,550 B1 | 1/2011 | Albertini et al. | |
| D637,814 S | 5/2011 | Akana et al. | |
| D643,396 S | 8/2011 | Hou | |
| 8,016,107 B2 | 9/2011 | Emsky | |
| D649,539 S | 11/2011 | Hong | |
| 8,051,980 B2 | 11/2011 | Tai et al. | |
| D655,287 S | 3/2012 | de Jong et al. | |
| 8,132,670 B1 | 3/2012 | Chen | |
| D658,186 S | 4/2012 | Akana et al. | |
| D658,187 S | 4/2012 | Diebel | |
| D658,188 S | 4/2012 | Diebel | |
| D658,363 S | 5/2012 | Biddle | |
| 8,173,893 B2 | 5/2012 | Huang | |
| 8,201,687 B2 | 6/2012 | Zeliff et al. | |
| D663,304 S | 7/2012 | Akana et al. | |
| 8,230,992 B2 | 7/2012 | Law et al. | |
| D665,812 S | 8/2012 | Huang et al. | |
| 8,235,208 B2 | 8/2012 | Sirichai et al. | |
| 8,253,518 B2 | 8/2012 | Lauder et al. | |
| D669,480 S | 10/2012 | Piedra et al. | |
| 8,281,924 B2 | 10/2012 | Westrup | |
| 8,281,950 B2 | 10/2012 | Potts et al. | |
| 8,282,065 B1 * | 10/2012 | Stone | 248/454 |
| 8,312,991 B2 * | 11/2012 | Diebel et al. | 206/45.24 |
| D672,353 S | 12/2012 | Liu | |
| D672,739 S | 12/2012 | Sin | |
| D672,781 S | 12/2012 | Lu | |
| 8,328,008 B2 | 12/2012 | Diebel et al. | |
| D675,625 S | 2/2013 | Hasbrook et al. | |
| D676,871 S | 2/2013 | Antonio | |
| D678,259 S | 3/2013 | Moore et al. | |
| D678,292 S | 3/2013 | Phillips et al. | |
| D678,327 S | 3/2013 | Lee et al. | |
| 8,393,464 B2 | 3/2013 | Yang et al. | |
| 8,395,465 B2 | 3/2013 | Lauder et al. | |
| D679,279 S | 4/2013 | Yang et al. | |
| D679,685 S | 4/2013 | Cox | |
| D679,692 S | 4/2013 | Fahrendorff et al. | |
| D679,694 S | 4/2013 | Fahrendorff et al. | |
| D682,836 S | 5/2013 | Akana et al. | |
| D684,567 S | 6/2013 | Murchison et al. | |
| 8,457,701 B2 | 6/2013 | Diebel | |
| 8,459,453 B2 | 6/2013 | Parker et al. | |
| 8,467,183 B2 | 6/2013 | Probst et al. | |
| D685,357 S | 7/2013 | Rekuc et al. | |
| D685,740 S | 7/2013 | Moore et al. | |
| D686,606 S | 7/2013 | Hong | |
| D686,607 S | 7/2013 | Hong | |
| 8,474,609 B1 | 7/2013 | Hong et al. | |
| D687,425 S | 8/2013 | Fahrendorff et al. | |
| D689,501 S * | 9/2013 | Fong | D14/447 |
| 8,542,480 B2 | 9/2013 | Williams et al. | |
| D691,601 S | 10/2013 | Murchison et al. | |
| D691,611 S | 10/2013 | Kirzinger | |
| D692,418 S | 10/2013 | Fahrendorff et al. | |
| 8,544,639 B2 | 10/2013 | Yang et al. | |
| 8,573,394 B2 | 11/2013 | Ahee et al. | |
| 8,584,847 B2 | 11/2013 | Tages et al. | |
| D695,729 S | 12/2013 | Shi et al. | |
| D696,253 S | 12/2013 | Akana et al. | |
| D696,256 S | 12/2013 | Piedra et al. | |
| D696,670 S | 12/2013 | Schiller et al. | |
| 8,720,843 B1 * | 5/2014 | Chen | 248/455 |
| 8,724,300 B2 * | 5/2014 | Smith et al. | 361/679.01 |
| D709,484 S | 7/2014 | Yoo | |
| 8,887,910 B2 * | 11/2014 | Ashley et al. | 206/320 |
| 8,925,722 B2 * | 1/2015 | Poon et al. | 206/320 |
| 2001/0014010 A1 | 8/2001 | Jenks et al. | |
| 2001/0052710 A1 | 12/2001 | Witherell | |
| 2002/0179470 A1 | 12/2002 | Lee | |
| 2003/0186729 A1 | 10/2003 | Engstrom et al. | |
| 2004/0018863 A1 | 1/2004 | Engstrom et al. | |
| 2004/0134812 A1 | 7/2004 | Yeh | |
| 2004/0224732 A1 | 11/2004 | Lee et al. | |
| 2004/0240164 A1 * | 12/2004 | Lee | 361/683 |
| 2005/0057893 A1 | 3/2005 | Homer et al. | |
| 2005/0237701 A1 | 10/2005 | Yu | |
| 2007/0001079 A1 | 1/2007 | Patterson, Jr. | |
| 2007/0056865 A1 | 3/2007 | Pelo | |
| 2007/0057140 A1 | 3/2007 | Liou et al. | |

(56) References Cited

U.S. PATENT DOCUMENTS

| | | |
|---|---|---|
| 2007/0166028 A1 | 7/2007 | Kranz et al. |
| 2007/0279855 A1 | 12/2007 | Linsmeier et al. |
| 2008/0029412 A1 | 2/2008 | Ho et al. |
| 2008/0043411 A1 | 2/2008 | Chih et al. |
| 2008/0045279 A1 | 2/2008 | Ohki |
| 2008/0055835 A1 | 3/2008 | Kumano et al. |
| 2008/0226286 A1 | 9/2008 | Huang |
| 2008/0237432 A1 | 10/2008 | Patterson |
| 2008/0302687 A1* | 12/2008 | Sirichai et al. ............... 206/320 |
| 2009/0109558 A1 | 4/2009 | Schaefer |
| 2009/0127423 A1 | 5/2009 | Chen et al. |
| 2009/0178938 A1 | 7/2009 | Palmer |
| 2009/0223765 A1 | 9/2009 | Bosma |
| 2009/0223845 A1 | 9/2009 | Bosma et al. |
| 2009/0230006 A1 | 9/2009 | Pidgley et al. |
| 2010/0072334 A1 | 3/2010 | Le Gette et al. |
| 2010/0082445 A1 | 4/2010 | Hodge et al. |
| 2010/0116710 A1 | 5/2010 | Huang et al. |
| 2010/0225429 A1 | 9/2010 | Tsai |
| 2010/0258602 A1 | 10/2010 | Amin |
| 2010/0277858 A1 | 11/2010 | Zhou |
| 2010/0294683 A1 | 11/2010 | Mish et al. |
| 2010/0294909 A1 | 11/2010 | Hauser et al. |
| 2011/0034221 A1 | 2/2011 | Hung et al. |
| 2011/0090626 A1 | 4/2011 | Hoellwarth et al. |
| 2011/0221319 A1 | 9/2011 | Law et al. |
| 2011/0240448 A1* | 10/2011 | Springer et al. ............ 200/331 |
| 2011/0284420 A1 | 11/2011 | Sajid |
| 2011/0290687 A1* | 12/2011 | Han ............................ 206/320 |
| 2011/0297566 A1 | 12/2011 | Gallagher et al. |
| 2011/0297581 A1 | 12/2011 | Angel |
| 2011/0315579 A1 | 12/2011 | Mase |
| 2012/0012483 A1* | 1/2012 | Fan ............................. 206/320 |
| 2012/0037285 A1* | 2/2012 | Diebel et al. ................ 150/165 |
| 2012/0037523 A1 | 2/2012 | Diebel et al. |
| 2012/0176741 A1 | 7/2012 | Wu et al. |
| 2012/0194448 A1 | 8/2012 | Rothkopf |
| 2012/0217174 A1 | 8/2012 | Ting |
| 2012/0224316 A1 | 9/2012 | Shulenberger |
| 2012/0298394 A1 | 11/2012 | Huang |
| 2012/0325702 A1 | 12/2012 | Gallagher et al. |
| 2013/0016467 A1 | 1/2013 | Ku |
| 2013/0045782 A1 | 2/2013 | Simmer |
| 2013/0048413 A1 | 2/2013 | Patzer |
| 2013/0048520 A1* | 2/2013 | Garrett et al. ............... 206/320 |
| 2013/0063873 A1 | 3/2013 | Wodrich et al. |
| 2013/0126365 A1 | 5/2013 | Hung |
| 2013/0140194 A1* | 6/2013 | Han ........................... 206/45.23 |
| 2013/0163980 A1 | 6/2013 | Lazaridis et al. |
| 2013/0170686 A1 | 7/2013 | Lester, Jr. |
| 2013/0213838 A1 | 8/2013 | Tsai et al. |
| 2013/0214661 A1 | 8/2013 | McBroom |
| 2013/0241381 A1 | 9/2013 | Hynecek et al. |
| 2013/0264459 A1 | 10/2013 | McCosh et al. |
| 2013/0271922 A1 | 10/2013 | Wilson et al. |
| 2013/0322660 A1 | 12/2013 | Weiss |
| 2014/0216954 A1* | 8/2014 | Law et al. .................. 206/45.23 |
| 2014/0246340 A1* | 9/2014 | Jiang et al. ................. 206/45.23 |
| 2014/0262853 A1* | 9/2014 | DeChant ...................... 206/45.2 |
| 2014/0291176 A1* | 10/2014 | Chung ........................ 206/45.23 |

FOREIGN PATENT DOCUMENTS

| | | | |
|---|---|---|---|
| CA | 2 827 491 A1 | 9/2012 | |
| EP | 1 548 544 A2 | 6/2005 | |
| EP | 2 392 986 A2 | 12/2011 | |
| EP | 2 426 571 A2 | 3/2012 | |
| EP | 2 564 722 A1 | 3/2013 | |
| EP | 2 638 823 A1 | 9/2013 | |
| EP | 2 337 373 B1 | 12/2013 | |
| GB | 2464583 B | 7/2010 | |
| GB | 2495330 A | 4/2013 | |
| GB | 2496109 A | 5/2013 | |
| JP | H073344 U | 1/1995 | |
| JP | 09135722 A | 5/1997 | |
| JP | 2000014426 A | 1/2000 | |
| JP | 2004509680 A | 4/2004 | |
| KR | 20080075716 B | 8/2008 | |
| KR | 10-1264668 B1 | 5/2013 | |
| KR | 10-2013-0081622 | 11/2013 | |
| WO | WO 01/90848 A2 | 11/2001 | |
| WO | WO 2010/036090 A2 | 4/2010 | |
| WO | WO 2011/115918 A1 | 9/2011 | |
| WO | WO 2011/130157 A2 | 10/2011 | |
| WO | WO 2011/156275 A2 | 12/2011 | |
| WO | WO 2012/112790 A2 | 8/2012 | |
| WO | WO 2013/058938 A1 | 4/2013 | |
| WO | WO 2013/096633 A1 | 6/2013 | |
| WO | WO 2013/103928 A1 | 7/2013 | |
| WO | WO 2013/126216 A1 | 8/2013 | |
| WO | WO 2013/128675 A1 | 9/2013 | |
| WO | WO 2013/188319 A1 | 12/2013 | |

OTHER PUBLICATIONS

Non-Final Office Action for U.S. Appl. No. 13/937,027 filed Jul. 8, 2013, and mailed from the USPTO on Feb. 3, 2015, 37 pgs.
Non-Final Office Action for U.S. Appl. No. 14/020,298 filed Sep. 6, 2013, and mailed from the USPTO on Feb. 12, 2015, 35 pgs.
International Searching Authority, International Search Report and Written Opinion of PCT/US2011/039287, mailed Dec. 28, 2011.
International Preliminary Report on Patentability for PCT/US2011/039287 filed Jun. 6, 2011, and mailed Dec. 20, 2012, 7 pgs.
Office Action for U.S. Appl. No. 12/370,824 filed Feb. 13, 2009, and mailed from the USPTO on Jan. 4, 2013, 19 pgs.
Office Action for U.S. Appl. No. 13/171,225 filed Jun. 28, 2011, and mailed from the USPTO on Apr. 16, 2013, 24 pgs.
Office Action for U.S. Appl. No. 13/285,565 filed Oct. 31, 2011, and mailed from the USPTO on May 9, 2013, 11 pgs.
Office Action for U.S. Appl. No. 12/370,824 filed Feb. 13, 2009, and mailed from the USPTO on May 20, 2013, 22 pgs.
Office Action for U.S. Appl. No. 13/791,445 filed Mar. 8, 2013, and mailed from the USPTO on Jun. 21, 2013, 20 pgs.
Third-Party Submission Under 37 CFR 1.290 Concise Description of Relevance, for U.S. Appl. No. 13/791,445, filed by Raymond Meiers in Ohio on Jul. 31, 2013, 14 pgs.
Notice of Allowance and Fee(s) Due for U.S. Appl. No. 12/370,824 filed Feb. 13, 2009, and mailed from the USPTO on Sep. 9, 2013, 12 pgs.
Office Action for U.S. Appl. No. 13/747,992 filed Jan. 23, 2013, and mailed from the USPTO on Oct. 23, 2013, 21 pgs.
Final Office Action for U.S. Appl. No. 13/791,445 filed Mar. 8, 2013, and mailed from the USPTO on Oct. 23, 2013, 21 pgs.
Final Office Action for U.S. Appl. No. 13/171,225 filed Jun. 28, 2011, and mailed from the USPTO on Dec. 4, 2013, 17 pgs.
Non-Final Office Action for U.S. Appl. No. 13/791,445 filed Mar. 8, 2013, and mailed from the USPTO on Dec. 27, 2013, 8 pgs.
Office Action for U.S. Appl. No. 13/739,846 filed Jan. 11, 2013, mailed Feb. 27, 2014, 19 pgs.
Non-final Office Action for U.S. Appl. No. 14/099,436 filed Dec. 6, 2013, and mailed from the USPTO on Mar. 26, 2014, 18 pgs.
Notice of Allowance and Fee(s) Due for U.S. Appl. No. 29/431,992 filed Sep. 12, 2012, and mailed from the USPTO on Apr. 2, 2014, 27 pgs.
Office Action for U.S. Appl. No. 13/791,445 filed Mar. 8, 2013, mailed from the USPTO Apr. 10, 2014, 9 pgs.
Notice of Allowance and Fee(s) Due for U.S. Appl. No. 13/747,992 filed Jan. 23, 2013, and mailed from the USPTO on Apr. 16, 2014, 10 pgs.
Notice of Allowance and Fee(s) Due for U.S. Appl. No. 13/791,445 filed Mar. 8, 2013, and mailed from the USPTO on Apr. 25, 2014, 8 pgs.
Office Action for U.S. Appl. No. 29/454,936 filed May 15, 2013, mailed from USPTO May 5, 2014, 22 pgs.
Office Action for U.S. Appl. No. 29/454,913 filed May 15, 2013, mailed from the USPTO May 7, 2014, 23 pgs.

(56) References Cited

OTHER PUBLICATIONS

Office Action for U.S. Appl. No. 29/454,934 filed May 15, 2013, mailed from the USPTO May 7, 2014, 23 pgs.

Notice of Allowance and Fee(s) Due for U.S. Appl. No. 14/099,436 filed Dec. 6, 2013, and mailed from the USPTO on May 13, 2014, 9 pgs.

Notice of Allowance and Fee(s) Due for U.S. Appl. No. 29/452,310 filed Apr. 15, 2013, and mailed from the USPTO on Sep. 25, 2014, 27 pgs.

Notice of Allowance and Fee(s) Due for U.S. Appl. No. 13/155,266 filed Jun. 7, 2011, and mailed from the USPTO on May 15, 2015, 8 pgs.

* cited by examiner

PORTABLE ELECTRONIC DEVICE CASE WITH AN ADHESIVE PANEL

RELATED APPLICATIONS

This application claims priority to U.S. Provisional Patent Application No. 61/858,410 filed on Jul. 25, 2013 and which is incorporated herein by reference.

TECHNICAL FIELD

The present disclosure relates generally to portable electronic devices and, more specifically, to case accessories for portable electronic devices.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
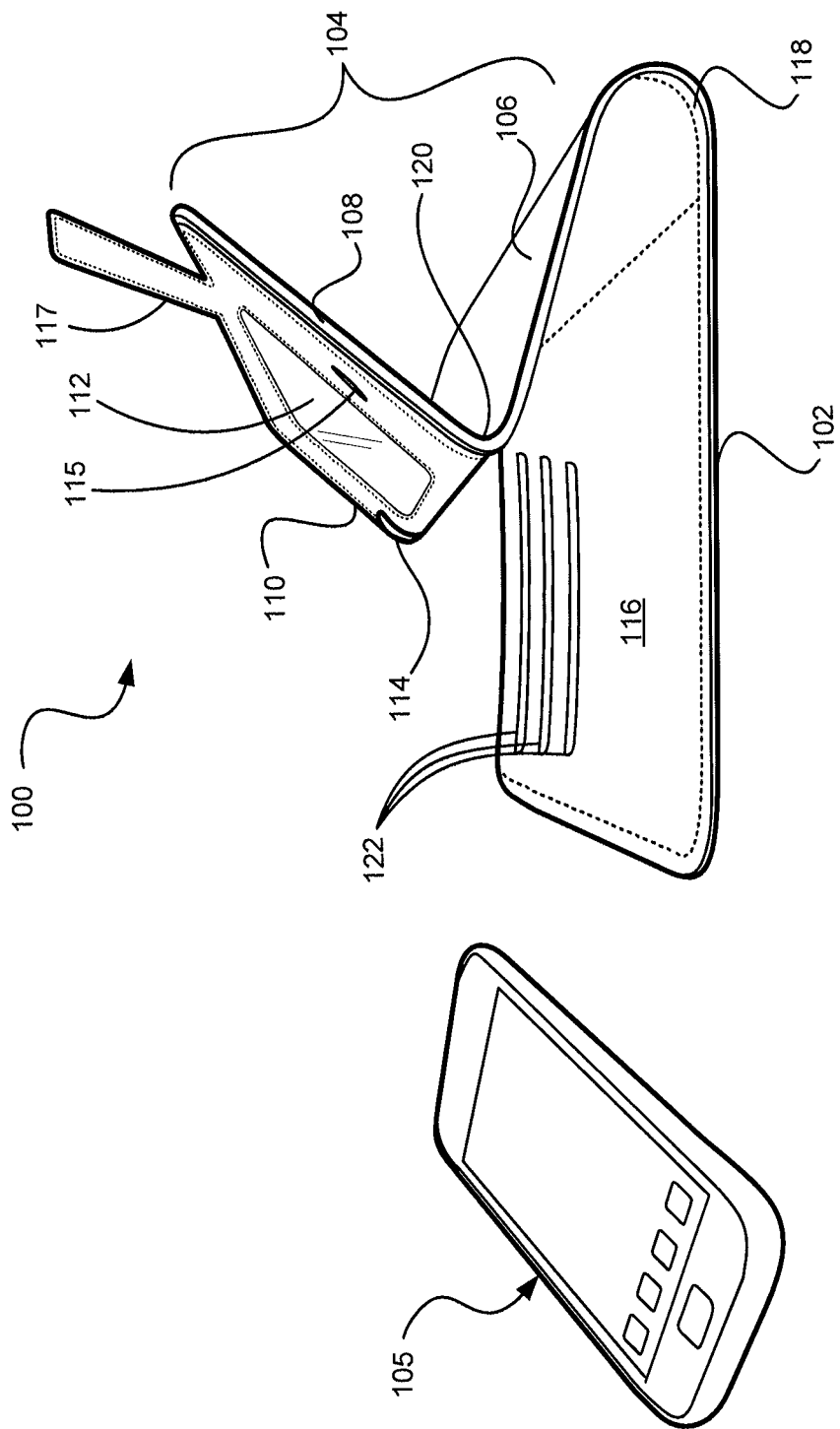
FIG. 1 is a perspective view illustrating a case in a display configuration consistent with embodiments of the present disclosure.

The proliferation of portable electronic devices (PEDs), including notebook and tablet computers (e.g., the Apple® iPad™), portable digital assistants (PDAs), and smartphones, has placed more computing power into the hands of users than the computing power of early computers that occupied an entire room. This portable computing power has enhanced both personal and business mobile productivity. Due to their portability, however, PEDs may be susceptible to damage. Embodiments of the present disclosure provide an accessory case for a PED configured to protect the PED from damage. In various embodiments, the case may be configured to enclose and protect the PED in a closed position and support the PED upright and/or elevated (i.e., propped up) in an open position. U.S. Pat. Nos. 8,746,449 and 8,783,458 and U.S. Patent Publication Nos. 2011/0297566 and 2012/0325702 are incorporated herein by reference and disclose features which may be utilized with the present disclosure.

Embodiments may be best understood by reference to the drawings. In certain instances, like features may be designated with like reference numerals. It will be readily understood that the components of the present disclosure, as generally described and illustrated in the drawings herein, could be arranged and designed in a wide variety of configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail.

Embodiments for a case are disclosed herein which covers a PED in stowage and supports a PED in an elevated viewing position. The case may be referred to as a holder, sleeve, mount, and the like and, as used herein, does not necessarily imply an encasing. The PED may be any portable electronic device including, for example, a notebook computer, an electronic book reader (e.g., the Amazon® Kindle™), a smartphone (e.g., the Apple® iPhone™, the Motorola® Droid®, and the BlackBerry® Storm™), and/or a tablet computer (e.g., the Apple® iPad™, the HP® Slate, and the Samsung® Galaxy™ Tablet). The PED can include on the front and/or the back face of the PED a display that is viewable in either a portrait orientation or a landscape orientation, a user input (not shown), and a data input/output port (not shown). In some embodiments, the case may be configured such that the display, user input, and data input/output port are accessible by a user of the PED while the PED is disposed in the case.

FIG. 1 illustrates one embodiment of a case 100, which includes a base panel 102 that is pivotally coupled to a support panel 104. The base panel 102 may be sized to cover a front side or display side of a PED 105, and the support panel 104 may be similarly sized to cover a back side of a PED 105. The front side or display side is referred to herein as the side that provides a display screen for user input and output. The panels 102, 104 may comprise various materials such as plastic, rubber, metal, leather, faux leather, vinyl, nylon, and/or any of a wide variety of alternative decorative or useful materials utilized in cases, bags, luggage, and the like. The support panel 104 may include a lower portion or middle flap/middle panel 106 pivotally coupled to the base panel 102. The support panel 104 may further comprise a pivot flap or pivot panel 108 pivotally coupled to the lower portion 106. Pivotal coupling may be accomplished through the use of any one of a number of various hinge devices including flexible materials to provide a defined pivot line or pivotal region.

The pivot flap 108 includes an interior surface 110 which supports a back side of the PED 105. An adhesive panel 112 is secured to the interior surface 110 to engage a back side of the PED 105. The adhesive panel 112 may include a variety of adhesives, glues, tapes, gels and the like to adhere to a PED back side and support the PED 105 in both display and stowage configurations. In one embodiment, the adhesive panel 112 includes Magia tape to stick to a PED back side. The adhesive panel 112 has an adhesive strength sufficient to retain and support the PED 105 in display and stowage configurations and is suitable for repeated separations and engagements with a PED 105. The adhesive panel 112 may extend across the majority of the surface area of the interior surface 110 to provide sufficient support strength to a PED 105.

The support panel 104 may further include one or more access apertures 114, 115 to enable access to the PED 105 for ports, buttons, cameras, and the like. In one embodiment, an access aperture 114 may extend across the pivot flap 108 and the lower portion 106.

The base panel 102 includes an interior surface 116 that may include a high-friction material to retain a position of a PED 105. The interior surface 116 may further be configured with one or more pockets or slots 122 to receive and retain articles commonly held in a wallet such as credit and debit cards, a driver's license, identification cards, business cards, RFI cards, paper currency and the like. The pockets or slots 122 may be located in a variety of configurations for user convenience.

Any of a variety of fasteners may be employed to selectively secure the base panel 102 and the support panel 104 together to maintain the case 100 in a stowage or closed position. In one embodiment, the case 100 includes a magnetic latch 117 which extends from the pivot flap 108 and magnetically couples with a magnetic element in the base panel 102. In alternative embodiments, a fastener may comprise any of a variety of fasteners commonly employed in cases, bags, and luggage. Examples of possible closure mechanisms include, but are not limited to, straps, buttons, flaps, snaps, zippers, Velcro, hooks, clasps, clips, magnets and combinations thereof. In certain embodiments, the ends of an elastic strap may be secured to the base panel 102 and the strap may be selectively wrapped around the support panel 104. Accordingly, the support panel 104 may be elastically maintained in a closed position. Additionally, though not illustrated, the case 100 may include any of a wide variety of straps, handles, harnesses, and/or the like configured to enable a user to easily transport the case 100.

Pivotal coupling of the base panel 102 and the support panel 104 may be enabled through various elements including a foldable region 118 where the panels 102, 104 join. The foldable region 118 may also be embodied as a hinge, pivot line, groove, and the like. The support panel 104 may also include a hinge or pivot line 120 or a foldable region to allow pivotal movement of the pivot flap 108 and the lower portion 106 relative to one another.

Figure 2:
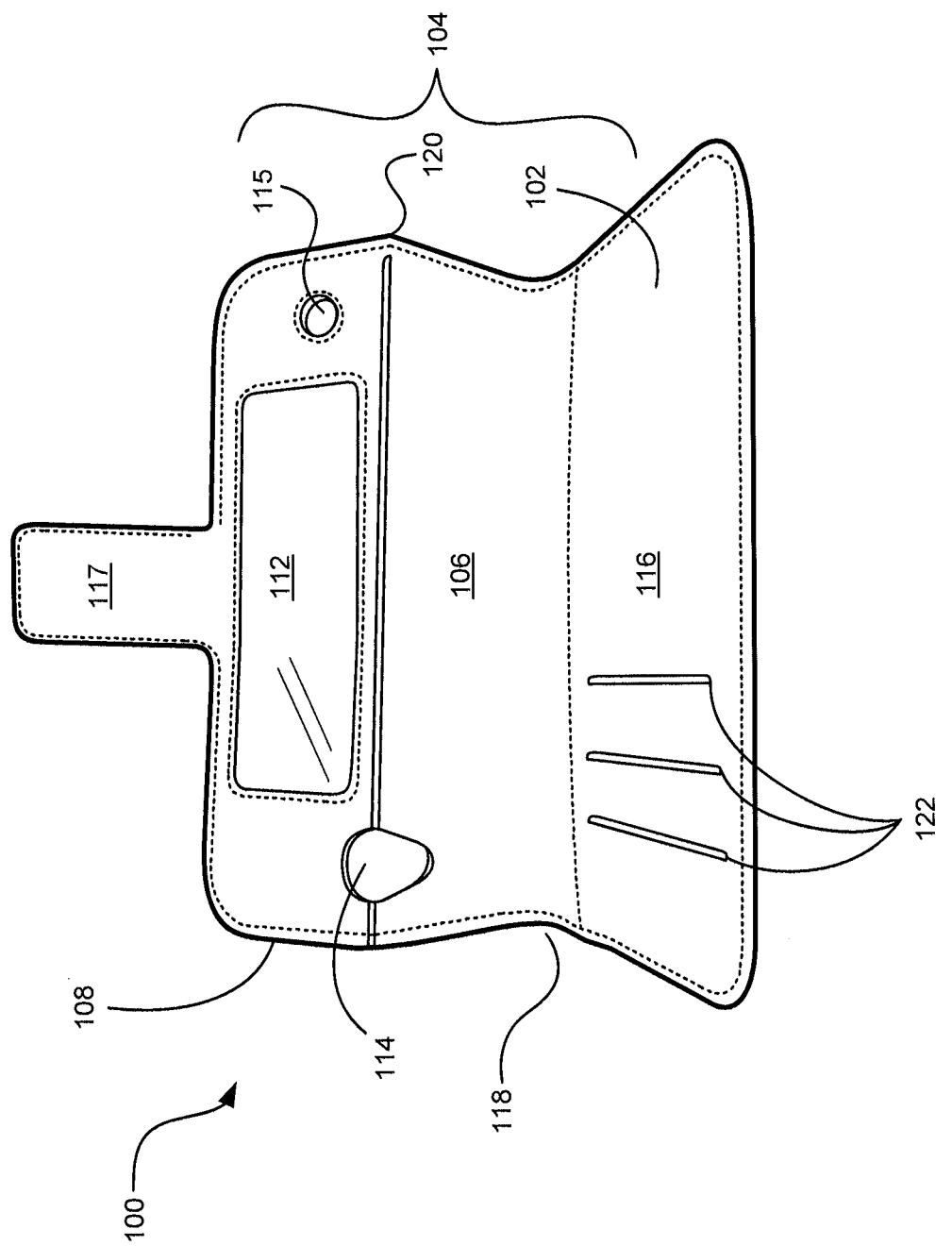
FIG. 2 is a front view of the case of FIG. 1 consistent with embodiments of the present disclosure.

Referring to FIG. 2, a front view of the case 100 in a display configuration is shown as it may be positioned in front of a user. The base panel 102 lies on a surface and the support panel 104 pivots to an elevated position.

Figure 3:
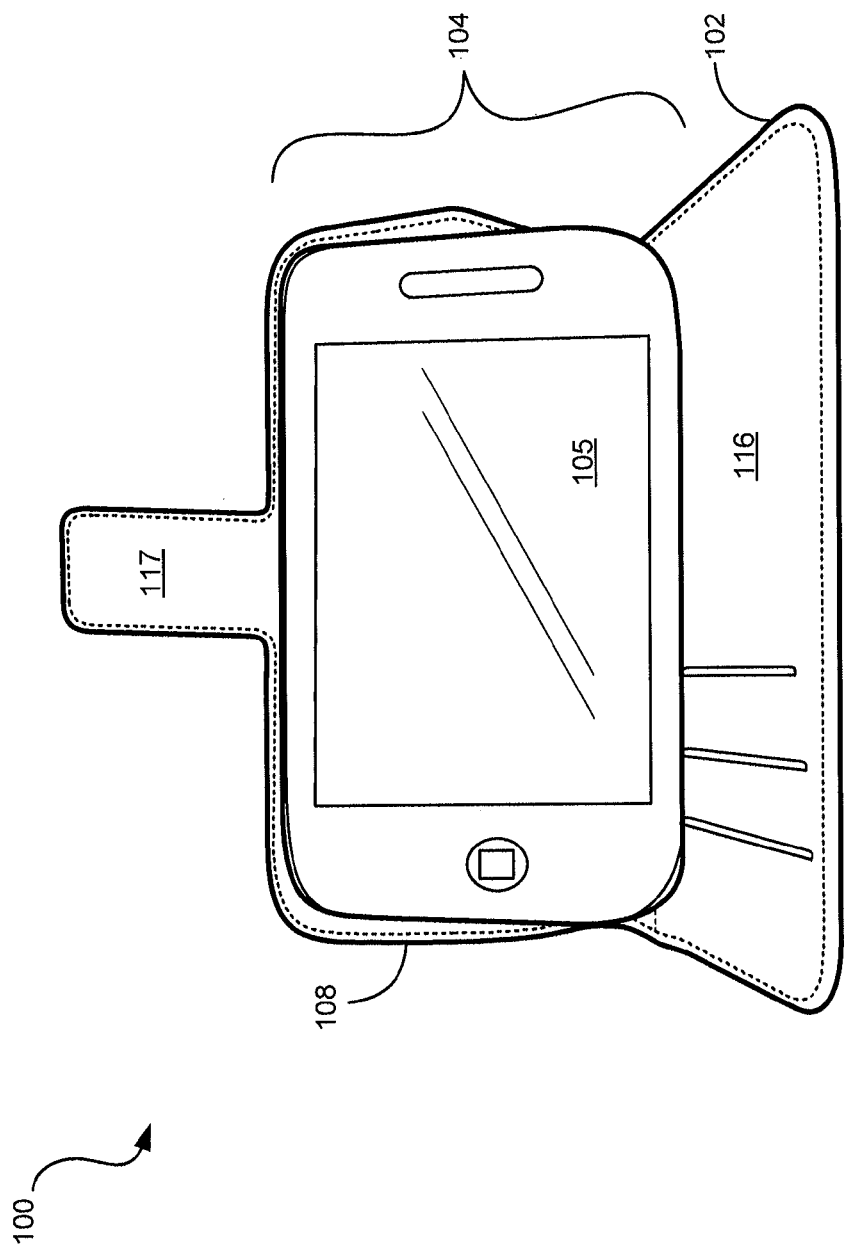
FIG. 3 is a front view of the case of FIG. 2 supporting a portable electronic device.

Referring to FIG. 3, the case 100 of FIGS. 1 and 2 is shown with a PED 105 supported in a display configuration. With the PED 105 secured to the adhesive panel 112, the pivot flap 108 and lower portion 106 may be each pivoted as needed to provide the desired viewing angle. A portion of the PED 105 engages the interior surface 116 of the base panel 102 to support the PED 105 at an elevated viewing angle. The support panel 104 provides a counterforce to the PED 105 in order to support the PED 105 in an upright and/or elevated position. In one embodiment, the support panel 104 may effectively "snap" into one or more predetermined positions in order to support the PED 105 at predetermined angles with respect to the base panel 102. According to various embodiments, the relative proportions of the base panel 102 and the support panel 104 may be adapted for a particular application.

In an alternative embodiment, the interior surface 116 may be configured with channels, grooves, ridges and the like (not shown) to secure a position of the PED 105. As such, an edge of the PED 105 engages the depression or protrusion formed by channels, grooves, or ridges. Alternatively, a frictional surface (e.g., rubberized surface or the like) or frictional contact patches may be utilized to secure the PED 105 into position.

Figure 4:
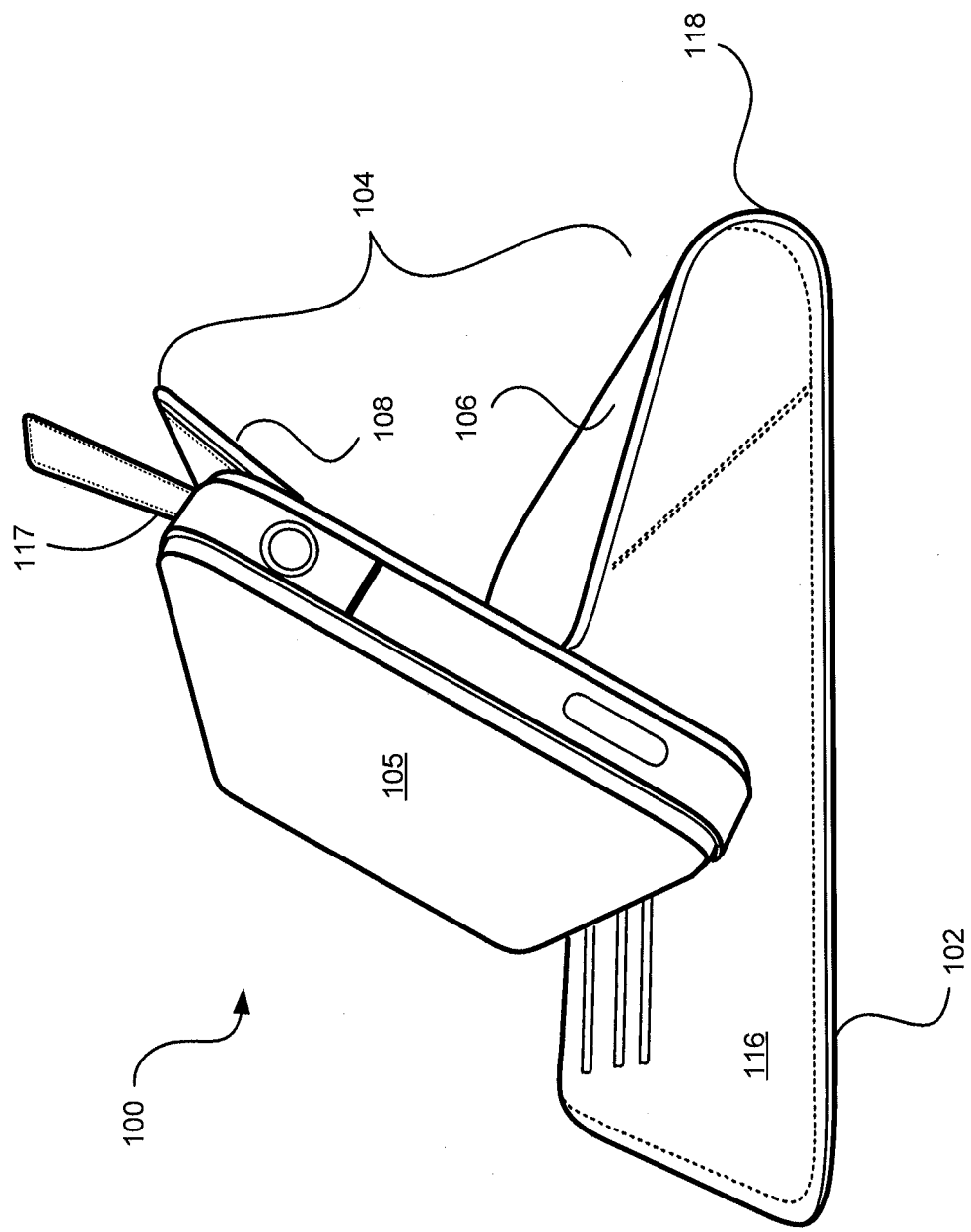
FIG. 4 is a perspective view illustrating a case in a display configuration and supporting a portable electronic device.

Referring to FIG. 4, a perspective view of the case 100 is shown supporting the PED 105 in the display configuration. The PED 105 is secured to the adhesive panel 112 so that support panel 104 can support the PED 105 at a desired angle. The PED 105 is displayed in a landscape orientation. However, if desired, a user may remove the PED 105 from the adhesive panel 112 and attach the PED 105 in a portrait orientation. The pivot flap 108 and the attached PED 105 may be pivoted into a stowage configuration so that the PED 105 is retained between the base panel 102 and the support panel 104.

Figure 5:
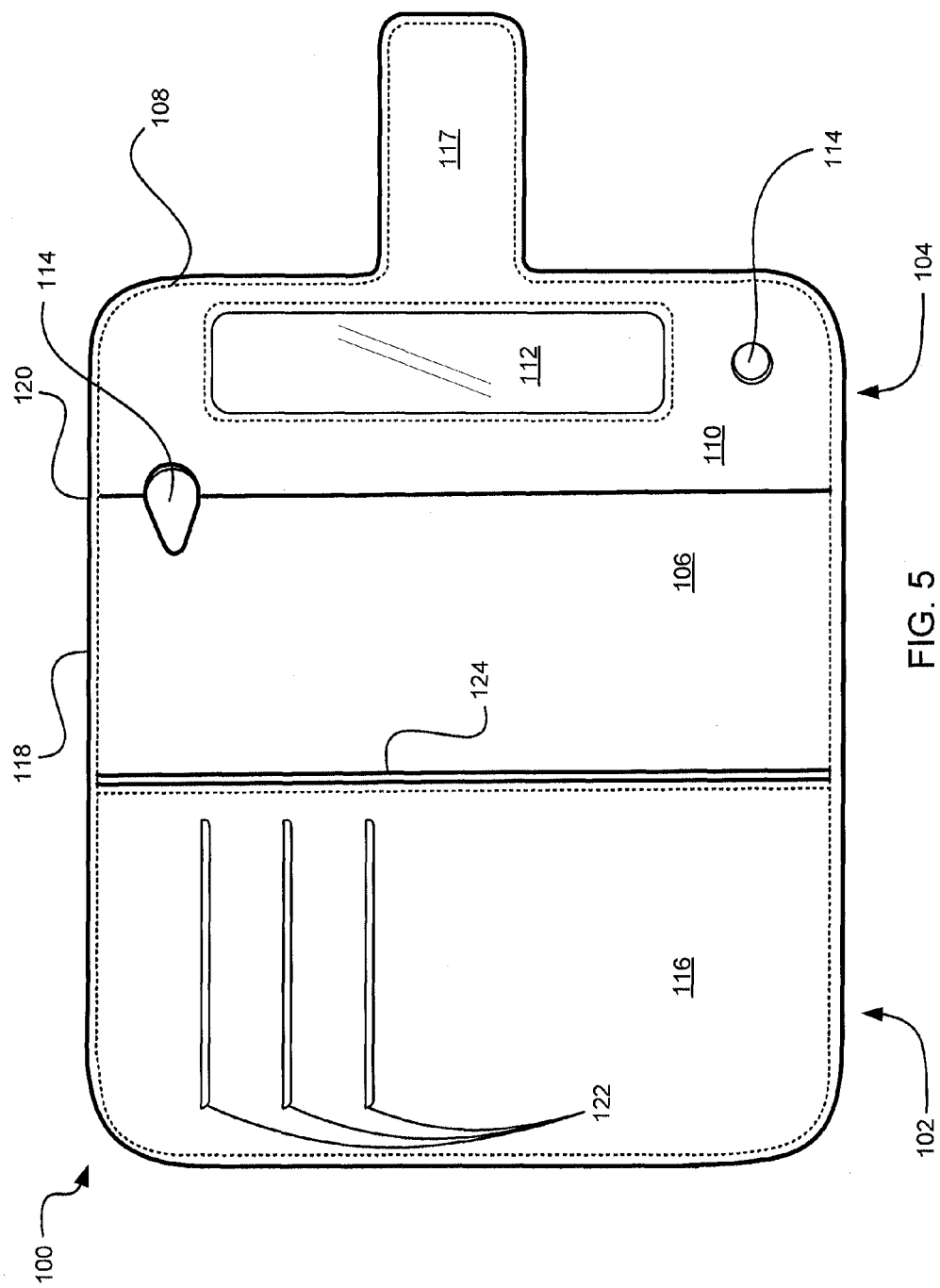
FIG. 5 is a plan view of one embodiment of a case consistent with embodiments of the present disclosure.

Referring to FIG. 5, a plan view of the case 100 is shown with the support panel 104, including the pivot flap 108 and the lower portion 106, lain flat and open-faced with the base panel 102. The case 100 is in an open position which is a transitional position between a display position and a stowage position. In addition to the pockets 122, the case 100 may include one or more additional pockets 124 extending along the length of the case 100 and substantially perpendicular to the pockets 122. As illustrated in FIG. 5, the case 100 can be described as a planar member with pivot or hinge points to allow bending of members 102, 106, and 108 into the desired position. In FIG. 5, the case 100 is in a full open position with the base panel 102, middle panel or lower portion 106, and pivot panel or pivot flap 108 all extending in the same plane. In the display position shown in FIGS. 1-4, the middle panel 106 and pivot panel 108 each pivot to support the PED 105 in an elevated position and the PED 105 rests on the interior surface 116 of the base panel 102.

Figure 6:
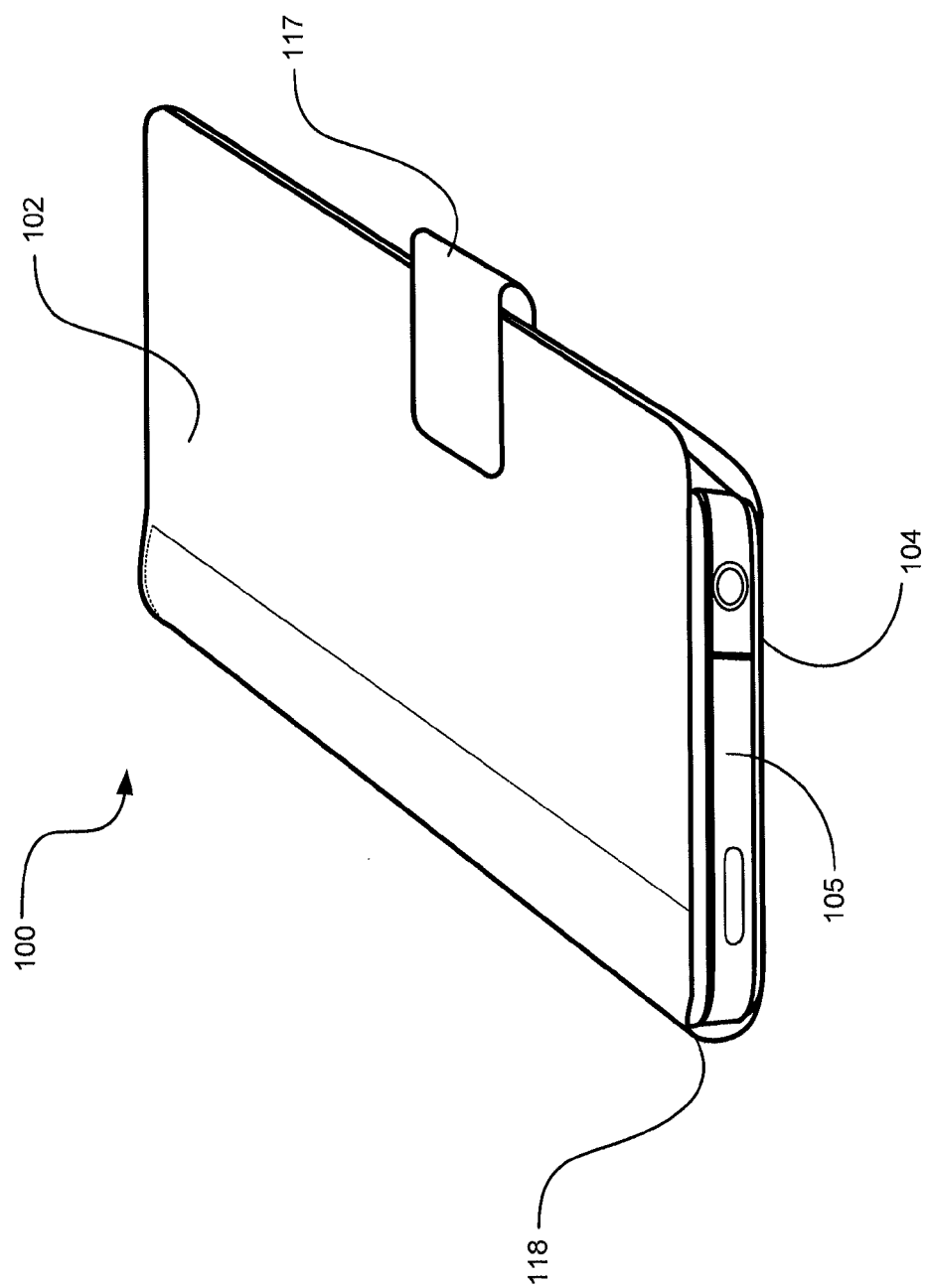
FIG. 6 is a perspective view illustrating one embodiment of a case in a stowage configuration and containing a portable electronic device.

Referring to FIG. 6, the case 100 is shown in a stowage position with the base panel 102 and the support panel 104 folded together along a foldable region 118 or hinge so that the base panel 102 and the support panel 104 provide protection to an enclosed PED 105 secured to the adhesive panel 112. In the stowage position, the middle panel 106 and pivot panel 108 are disposed in the same plane and extend over an interior surface 116 of the base panel 102.

The base panel 102 and the support panel 104 protect the PED 105 from scratches, damage as a result of a fall, extreme temperatures, and/or other conditions that may result in damage to the PED 105. In alternative embodiments, any portion of the case 100 may be reinforced with padding, metal, plastic, cardboard, rubber, and/or other material or combination thereof. In certain embodiments, reinforcing material may utilize various folds, bends, and/or curvatures to obtain desirable resistance and/or resilience characteristics. As illustrated, the ports along the perimeter of the PED 105 may be accessible. In the illustrated embodiment, the latch 117 extends from the support panel 104 and engages the base panel 102.

Figure 7:
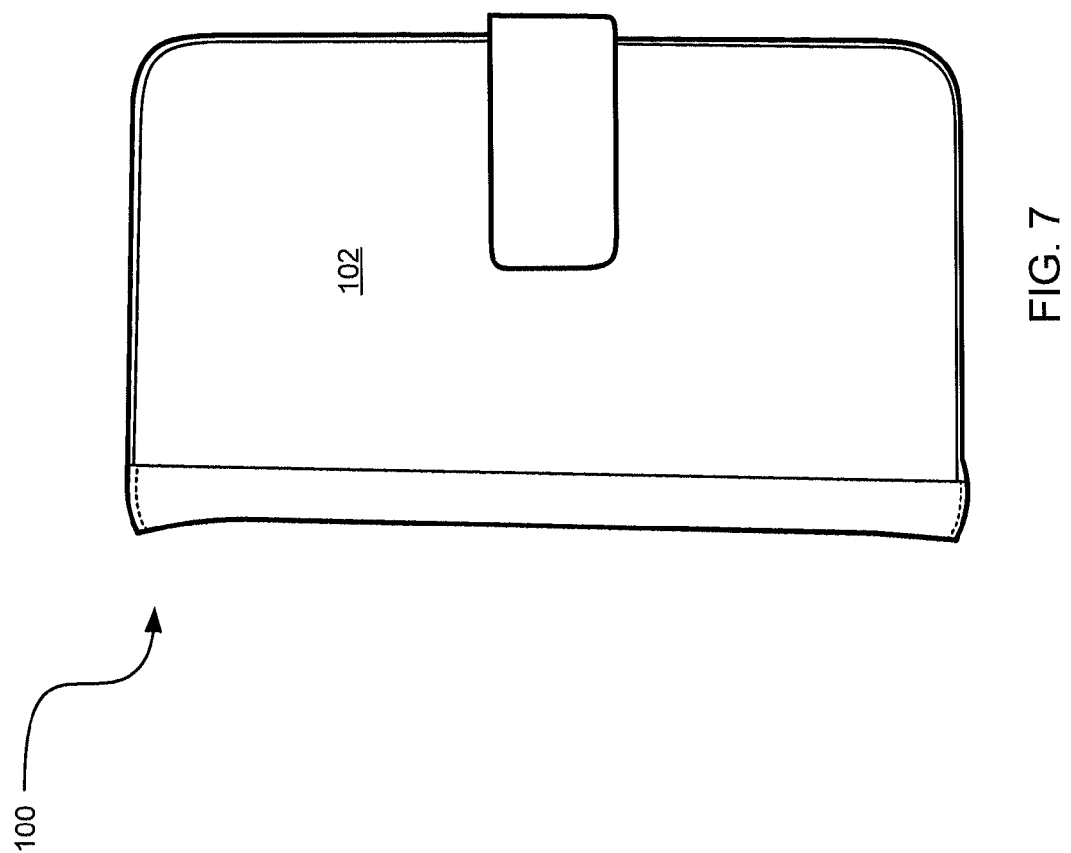
FIG. 7 is a plan view illustrating an embodiment of a case in a stowage configuration consistent with embodiments of the present disclosure.

Referring to FIG. 7, a plan view of the case 100 is shown in the stowage position. The base panel 102 extends across a display side of the PED 105 to prevent damage to the display.

Figure 8:
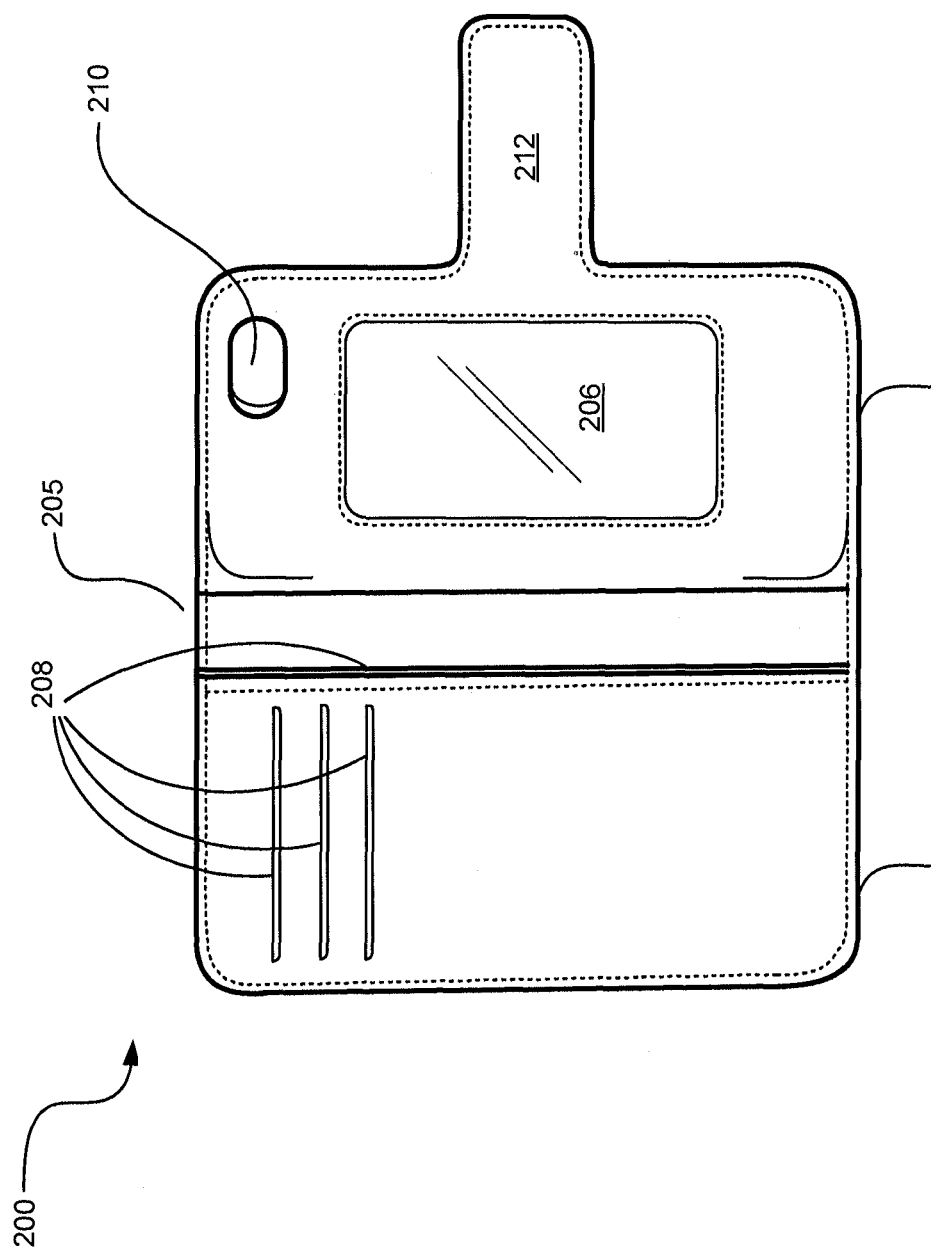
FIG. 8 is a plan view illustrating an alternative embodiment of a case.

Referring to FIG. 8, a plan view of an alternative embodiment of a case 200 is shown in a full, open position. The case 200 includes a base panel 202 pivotally coupled to a support panel 204 along a hinge or foldable region 205. However, in the illustrated embodiment, the support panel 204 includes a single, substantially planar and rigid panel rather than two panels as previously disclosed with respect to support panel 104. The case 200 functions as a bi-fold apparatus to support and protect a PED. In the full, open position, the base panel 202 and the support panel 204 extend in the same plane. The support panel 204 includes an adhesive panel 206, similar to that describe above, to retain a PED in both open and stowage configurations. The base panel 202 may include one or more pockets 208 to retain loose articles such as credit and debit cards, a driver's license, identification cards, business cards, RFID cards, paper currency and the like. The case 200 may also include one or more apertures 210 on either the support panel 204 or base panel 202 to provide access to the PED. The case 200 may also include a fastener 212, such as any one of the embodiments previously disclosed that couple the base and support panels 202, 204 together in a stowage position.

Figure 9:
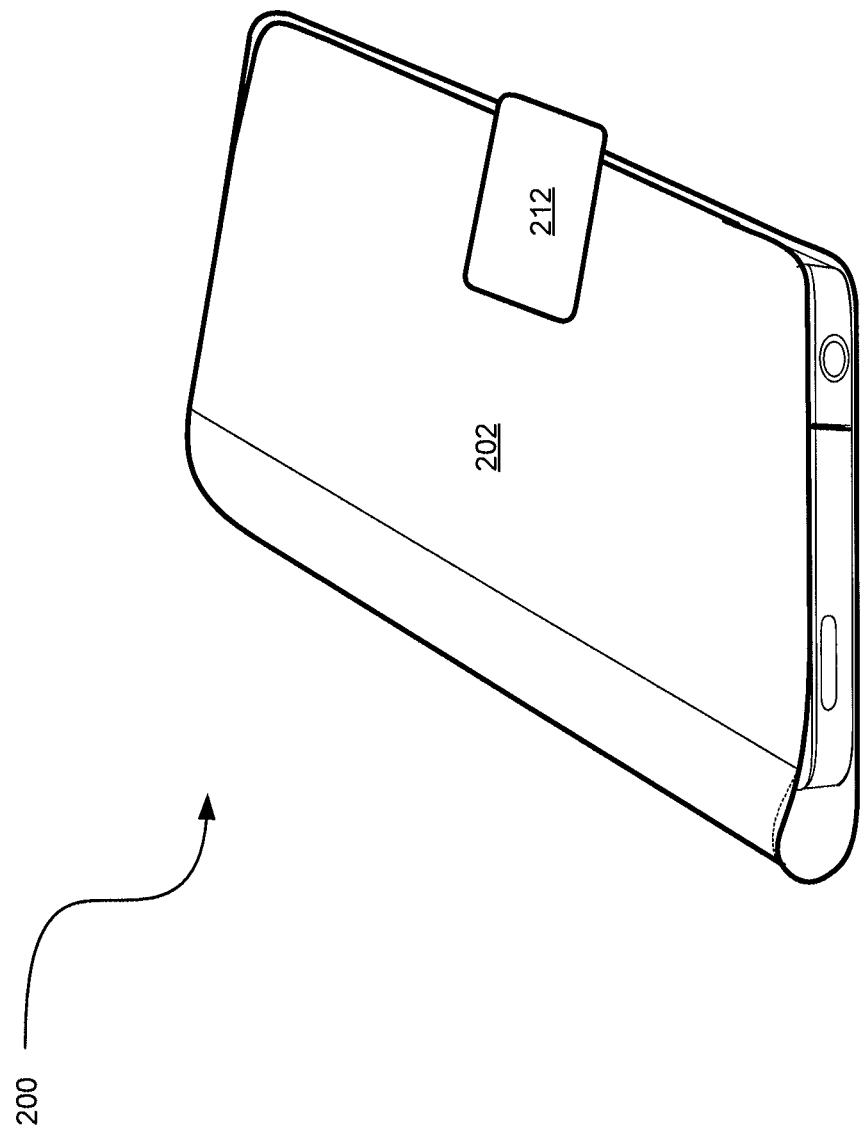
FIG. 9 is a perspective view illustrating the embodiment of the case of FIG. 9 in a stowage configuration.

Referring to FIG. 9, a perspective view of the case 200 is shown in a stowage configuration with the base and support panels 202, 204 substantially parallel to one another and with the PED disposed between. The panels 202, 204 are shown secured to one another through use of the fastener 212.

Figure 10:
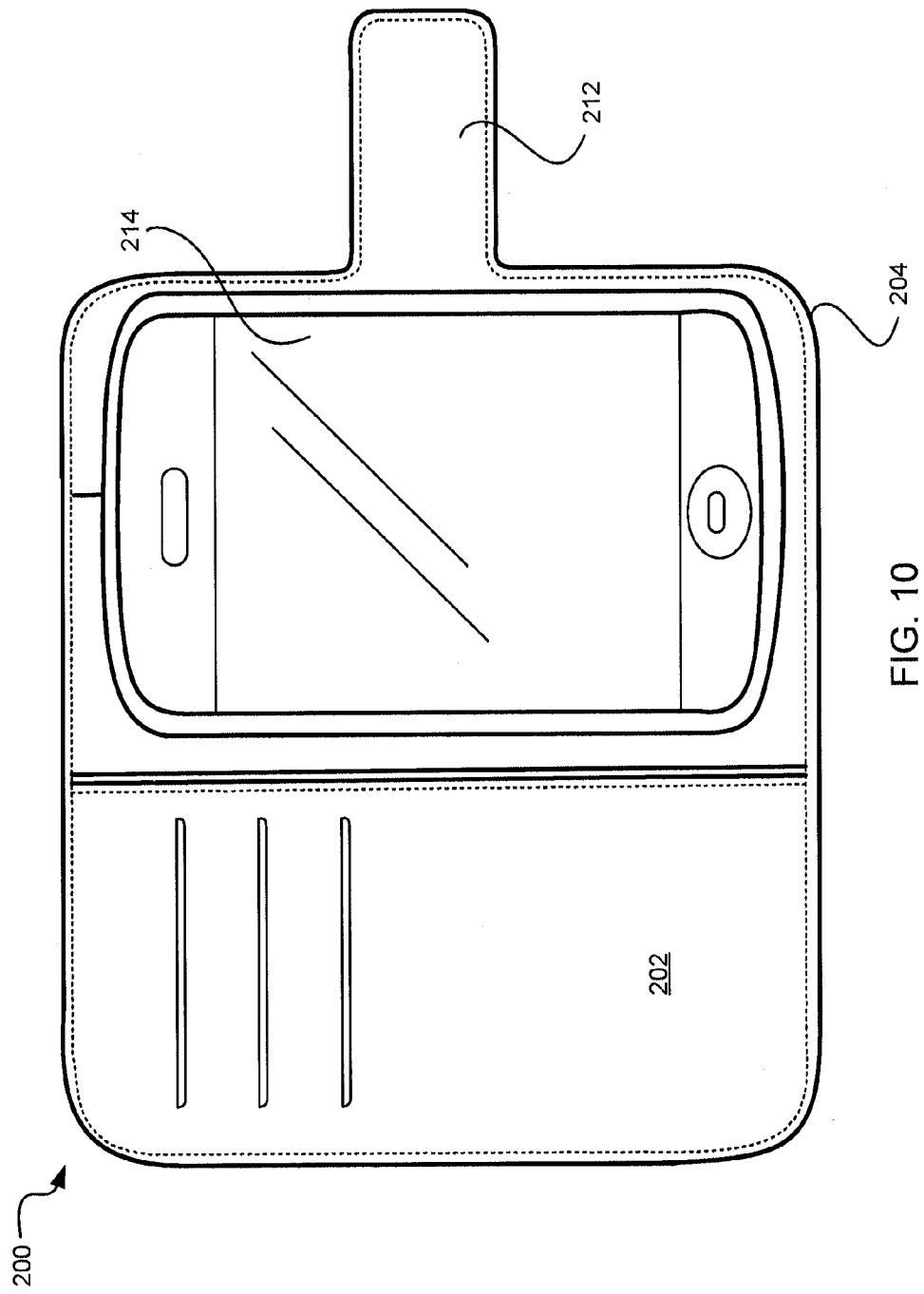
FIG. 10 is a perspective view illustrating the case of FIGS. 8 and 9 in an open configuration.

Referring to FIG. 10, a perspective view of the case 200 is shown in an open configuration to allow viewing and access to a PED 214. The PED 214 is secured to the adhesive panel 206 to secure the PED 214 to the support panel 204 in both the stowage and open configurations. As disclosed, a user may conveniently access the PED 214 in the open configuration and then close the case 200 to protect the PED 214. The PED 214 may have a surface area which extends across the majority of an interior of the support panel 204 and, similarly, extends across the majority of an interior of the base panel 202. In this manner, the case 200 may have a size approximating a smart phone which allows the case 200 and PED 214 to be conveniently hand-held and stored in a pocket or handbag.

It will be understood by those having skill in the art that changes may be made to the details of the above-described embodiments without departing from the underlying principles presented herein. In addition, any suitable combination of various embodiments, or the features thereof, is contemplated. Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

What is claimed is:

1. A case to support and store a portable electronic device having a front side and a back side, the case comprising:
   a planar member configured to transition from a stowage position, open position, and a display position, the planar member including,
      a base panel,
      a middle panel pivotally coupled to the base panel, and
      a pivot panel pivotally coupled to the middle panel; and
   an adhesive panel, coupled to the pivot panel, to directly engage and secure the back side of the portable electronic device wherein the adhesive panel has sufficient adhesive strength to secure the portable electronic device in the stowage, open, and display positions and is further configured for repeated separations and engagements with the portable electronic device,
   wherein in the stowage position, the middle panel and the pivot panel are disposed in the same plane and extend over an interior surface of the base panel,
   wherein in the open position, the base panel, middle panel, and pivot panel all extend in the same plane, and
   wherein in the display position, the middle panel and pivot panel each pivot to support the portable electronic device in an elevated position and the portable electronic device rests on the interior surface of the base panel.

2. The case of claim 1, wherein the panel member further comprises a fastener extending from the pivot panel, the fastener configured to retain the base panel, middle panel and pivot panel in the stowage configuration.

3. The case of claim 1, wherein the adhesive panel comprises reusable adhesive tape.

4. The case of claim 1, wherein the adhesive panel extends over the majority of the interior surface of the pivot panel.

5. The case of claim 1, wherein the interior surface of the base panel includes a pocket.

6. The case of claim 1, wherein the interior surface of the base panel comprises a high-friction material.

7. The case of claim 6, wherein the high-friction material is a rubberized material.

8. A case to support and store a portable electronic device having a front side and a back side, the case comprising:
   a base panel configured to sit on a working surface;
   a support panel pivotally coupled to the base panel and configured to support a portable electronic device in an elevated position, the support panel comprising:
      a lower portion pivotally coupled to the base panel; and
      a pivot flap pivotally coupled to the lower portion and including an adhesive panel to directly engage and secure the back side of the portable electronic device wherein the adhesive panel has sufficient adhesive strength to secure the portable electronic device in the stowage, open, and display positions and is further configured for repeated separations and engagements with the portable electronic device,
   wherein the base panel and support panel pivot to a display configuration wherein the portable electronic device is supported by the pivot flap and the portable electronic device rests on the base panel, and wherein the base panel and support panel pivot to a stowage configuration wherein the portable electronic device is disposed between the base panel and support panel with the base panel covering the front side of the portable electronic device.

9. The case of claim 8, wherein the adhesive panel comprises reusable adhesive tape.

10. The case of claim 8, wherein the adhesive panel extends over the majority of the surface area of an interior surface of the pivot flap.

11. The case of claim 8, wherein an interior surface of the base panel includes a pocket.

12. The case of claim 8, further comprising a fastener to retain the base panel and the support panel in the stowage configuration.

13. The case of claim 8, wherein the base panel comprises an interior surface having a high-friction material.

14. The case of claim 13, wherein the high-friction material is a rubberized material.

* * * * *